Aug. 18, 1970  TAKAO MIYASHITA ET AL  3,524,768
METHOD OF TREATING PLASTIC FILM
FOR ELECTRIC INSULATION
Filed May 28, 1965

INVENTORS
TAKAO MIYASHITA
TATSUO IGAWA
YO MAEDA

BY  Paul M. Craig, Jr.
ATTORNEY 3,524,768
METHOD OF TREATING PLASTIC FILM FOR ELECTRIC INSULATION
Takao Miyashita, Hitachi-shi, Tatsuo Igawa, Kitaibaragi-shi, and Yo Maeda, Shimodate-shi, Japan, assignors to Hitachi Chemical Company Ltd., and Hitachi, Ltd., Tokyo, Japan
Filed May 28, 1965, Ser. No. 459,863
Claims priority, application Japan, May 29, 1964, 39/30,089
Int. Cl. B08b 7/02
U.S. Cl. 134—1                                    7 Claims

ABSTRACT OF THE DISCLOSURE

A method for increasing the dielectric strength and preventing insulation breakdown at low voltage of synthetic polymeric films containing extraneous conductive particles which have been introduced into said film during production thereof, said method including the steps of: (1) removing said conductive particulates without causing deterioration of said film by immersing said film in a mineral acid solution heated to a temperature below the softening point of the film to remove the conductive particles contained in the film, while subjecting said film to ultrasonic vibrations; (2) washing the film with water; (3) treating said film with an alkaline solution to neutralize said acid; and (4) washing said film with water.

---

This invention relates to a method for the treatment of a plastic film for electric insulation. More particularly, it relates to a method for treating a plastic film for electric insulation breakdown of the plastic film by chemically treating which comprises chemically removing the extraneous conductive particulates contained in the plastic film which particulates cause insulation faults of the film to prevent the insulation of the film from being broken down.

Plastic films for electric insulation sometimes suffer insulation breakdown at an unexpectedly low voltage when extraneous conductive particulates are present in the films. That is the presence of the conductive particulates deteriorates the insulation ability of the film. Moreover when two films, one over the other, are used, even though one of them is perfect, protrusion of conductive particulates existing in the other gives rise to mechanical fault of the former film and the particulates increases gradient of electrical potential by the same action as needle electrode.

The conductive particulates are of diameters in the range of 0.01–0.1 mm. and consist essentially of metals like Al, Cu, Fe, Mg, etc., these essential components being not always uniformly contained in all the particulates.

The extraneous conductive particulates seemingly comes from the catalyst used in synthesis of high polymer and the metallic powder incorporated in the film production.

An object of the present invention is to provide a method for treating a plastic film for electrical insulation to increase the dielectric strength of the film.

Figure 1:
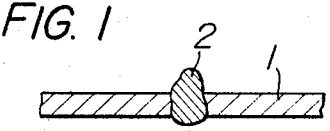
Figure 2:

In FIG. 1, the extraneous conductive particulates 2 coexisting in the plastic film 1 is chemically removed by dissolution with an acid to become a state as shown in FIG. 2.

According to the present process, the conductive particulates, such as metals contained in films are dissolved upon immersing the films into an acid solution. Even if the particulates are not completely dissolved, they are removed from the films.

It is effective in the course of this treatment to raise the temperature of the solution and exert ultrasonic vibration.

Although pinholes are formed in the film as shown in FIG. 2 after the removal of the conductive particulates, it is recognized that the dielectric strength of the film is significantly increased as compared with the film containing the conductive particulates. Especially when the film is used in the oil-immersion state, the existence of pinholes does not affect adversely the insulation.

The following examples illustrate the process of the present invention.

EXAMPLE 1

A polyethylene film 1 (FIG. 1) of $20\mu$ thickness having conductive particulates 2 incorporated thereinto was immersed into about 10 N sulfuric acid (60° C.) for about 10 min., washed with water, treated with an 0.1 N caustic soda solution, and further washed with hot water (80° C.). The average dielectric strength of the thus obtained film 2 (FIG. 2) and a normal film, one laying over the other was (A) 4.6 kv., and (B) was 6.4 kv., wherein (A) refers to the film being not oil-immersed and (B) to the film oil-immersed. (Hereinafter (A) and (B) are used with the same meanings.)

EXAMPLE 2

The average dielectric strength of a normal film and the film obtained by repeating the procedure of Example 1 except that about 10 N nitric acid was used instead of about 10 N sulfuric acid, one of the films laying over the other, was (A) 4.5 kv. and (B) 6.3 kv.

Comparison example

The average dielectric strength of two normal films, one over the other, was (A) 7.1 kv. and (B) 8.6 kv.

The average dielectric strength of a normal film and a normal film having holes perforated by needle, one laying over the other, was (A) 4.8 kv. and (B) 6.1 kv.

The average dielectric strength of a normal film and a conductive particle-containing film, one laying over the other, was (A) 1.9 kv. and (B) 2.1 kv.

The same results were obtained by applying the present treatment to polypropylene of $18\mu$ thickness.

From the results in the above examples, it is seen that the acid treatment enables the conductive particulates to be removed from the film, and extremely increases the average dielectric strength of the obtained film and another film as compared with that of the film without acid treatment, the former having substantially the same dielectric strength as the film having pinholes. Said chemical treatment can be effectively conducted by selecting such time, temperature and solution concentration that the plastic films are not deteriorated during the treatment.

What we claim is:

1. A method for increasing the dielectric strength and preventing insulation breakdown at low voltage of synthetic polymeric films containing extraneous conductive particulates which have been introduced into said film during the production thereof, said method comprising the steps of removing said conductive particulates without causing deterioration of said film by immersing said film in a mineral acid solution heated at a temperature below the softening point of the film to remove the conductive particles contained in the film and treating said film with an alkaline solution to neutralize said acid.

2. The method of claim 1, wherein the film is subjected to ultrasonic vibrations simultaneously with the acid treatment.

3. The method of claim 1, wherein the conductive particulates are catalyst used in the synthesis of the synthetic polymeric film and metallic powder incorporated in the film production.

4. The method of claim 3, wherein the conductive particles are selected from the group consisting of aluminum, copper, iron and magnesium.

5. The method of claim 1, wherein the synthetic polymeric film is a polyolefin selected from the group consisting of polyethylene and polypropylene.

6. The method of claim 5, wherein the polyolefin film has a thickness of about 18 to 20 microns.

7. The method of claim 1, wherein the acid-treated film and neutralized film is further treated with hot water.

References Cited

UNITED STATES PATENTS

| | | | |
|---|---|---|---|
| 2,279,267 | 4/1942 | Kremers | 148—8 |
| 2,616,820 | 11/1952 | Bourgeaux | 148—6.15 |
| 2,702,260 | 2/1955 | Massa | 204—14 X |
| 3,094,585 | 6/1963 | Rudner | 174—77 |
| 3,099,584 | 7/1963 | Walsh | 134—38 X |
| 3,192,309 | 6/1965 | Zoder et al. | 156—53 X |
| 3,202,733 | 8/1965 | Strauss | 264—49 |
| 3,231,419 | 1/1966 | Korpman. | |
| 3,325,325 | 6/1967 | Ward | 156—56 |
| 3,356,551 | 12/1967 | Glenn et al. | 156—49 |
| 3,364,063 | 1/1968 | Satas. | |
| 2,324,466 | 7/1943 | Bowen et al. | 264—49 |
| 2,714,565 | 8/1955 | Heywang | 134—105 X |
| 2,967,119 | 1/1961 | Gutterman | 134—1 |
| 2,992,142 | 7/1961 | Kearney | 134—105 X |
| 3,147,148 | 9/1964 | Goodin | 134—28 |
| 3,308,073 | 3/1967 | Kepple | 260—2.5 |

FOREIGN PATENTS 351,076  3/1922  Germany.

DENNIS E. TALBERT, Jr., Primary Examiner

U.S. Cl. X.R.

18—1; 55—522; 134—15, 27, 28, 29, 30; 174—137; 252—63; 264—49